(12) United States Patent
Shan (10) Patent No.: US 7,664,671 B2
(45) Date of Patent: Feb. 16, 2010

(54) METHODS AND SYSTEMS FOR PROFILE-BASED FORECASTING WITH DYNAMIC PROFILE SELECTION

(75) Inventor: Jerry Z. Shan, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1186 days.

(21) Appl. No.: 11/001,455

(22) Filed: Dec. 1, 2004

(65) Prior Publication Data

US 2006/0116921 A1 Jun. 1, 2006

(51) Int. Cl.
*G06F 17/30* (2006.01)
(52) U.S. Cl. ...................................................... 705/10
(58) Field of Classification Search ................... 705/10
See application file for complete search history.

(56) References Cited

U.S. PATENT DOCUMENTS

| | | | | |
|---|---|---|---|---|
| 5,136,686 | A * | 8/1992 | Koza ............................ | 706/13 |
| 5,712,985 | A | 1/1998 | Lee et al. | |
| 6,125,105 | A * | 9/2000 | Edwards et al. ............. | 370/230 |
| 6,188,989 | B1 * | 2/2001 | Kennedy ........................ | 705/8 |
| 6,311,173 | B1 * | 10/2001 | Levin et al. .................... | 706/21 |
| 6,581,008 | B2 * | 6/2003 | Intriligator et al. ............. | 702/3 |
| 6,731,990 | B1 * | 5/2004 | Carter et al. ................... | 700/52 |
| 6,917,952 | B1 * | 7/2005 | Dailey et al. ................ | 707/203 |
| 6,978,249 | B1 * | 12/2005 | Beyer et al. .................... | 705/10 |
| 7,292,960 | B1 * | 11/2007 | Srinivasa et al. ............ | 702/185 |
| 7,337,135 | B1 * | 2/2008 | Findlay et al. ............ | 705/36 R |
| 7,454,377 | B1 * | 11/2008 | Beaumont .................. | 705/36 T |

FOREIGN PATENT DOCUMENTS

EP 0883067 A1 * 9/1998

OTHER PUBLICATIONS

Das, Gautam et al., Finding Similar Time Series Proceedings of the First European Symposium on Principles of Data Mining and Discovery, 1997.*
Schwartz et al., Improving the accuracy of hotel reservations forecasting: Curves similarity approach Journal of Travel Research, Summer 1997, vol. 36, No. 1.*
Roberts, David, Attribute Smoothing: A Pattern Forecasting Technique Northeast SAS User Group Conference, 1997.*
Gunopulos, Dimitrios et al., Time series similarity measures (tutorial PM-2) Tutorial notes of the sixth ACM SIGKDD international conference on Knowledge discovery and data mining, 2000.*
Wang, Liang et al., An Expert System For Forecasting Model Selection IEEE, 1992.*
Shan, Jerry Z. et al., Dynamic Modeling and Forecasting on Enterprise Revenue with Derived Granularities HP Laboratories, HPL2005-90, May 12, 2005.*

(Continued)

*Primary Examiner*—Scott L Jarrett (57) ABSTRACT

Disclosed herein are systems and methods for profile-based forecasting with dynamic profile selection. Some method embodiments may comprise determining a reference set of profiles from a source set of profiles, and using the reference set of profiles to generate a forecast. The reference set determination comprises at least comparing a current, partial profile to each profile in the source set to obtain a similarity measurement for each profile in the source set.

18 Claims, 4 Drawing Sheets

OTHER PUBLICATIONS

Collopy, Fred, Rule-Based Forecasting: Development and Validation of an Expert Systems Approach to Combining Time Series Extrapolations, Management Science, vol. 38, No. 10, 1992.*

Smarcorp.com Webpages Smart Software Corporation, May-Jul. 2001, Retrieved from Archive.org Dec. 20, 2005.*

Autobox 5.0 for Windows—User's Guide & Reference Guide Automatic Forecasting Systems, Inc., Dec. 10, 1999.*

Markidakis, Spyros et al., Forecasting Methods and Applications—Third Edition John Wiley & Sons, Inc., 1998.*

Harrison, H.C., An Intellifent Business Forecasting System ACM 1993.*

* cited by examiner

METHODS AND SYSTEMS FOR PROFILE-BASED FORECASTING WITH DYNAMIC PROFILE SELECTION

BACKGROUND

Commercial enterprises compete for customers by promising, among other things, low prices and fast delivery. Successful competition often requires careful monitoring of profit margins and deadlines. One key to success in this environment is a system that provides accurate and timely business information. Financial data and other information that indicates the state of the corporation can no longer be examined only on a periodic basis, but rather must be continually monitored. Businesses rely on their latest performance information to support strategic planning and decision making, so any businesses without a system for providing accurate and timely business information would be at a huge disadvantage relative to their competitors.

Accordingly, most businesses track at least their financial data in a computerized financial reporting system that can generate reports on demand. Many large entities have reporting systems that process large numbers of complex transactions which may be occurring at many locations around the world.

Businesses often wish to use such computerized data to forecast some outcome (e.g., end-of-quarter revenue, end-of-month inventory, or end-of-year overhead costs) or to monitor the probability of achieving some goal to support current business decisions. This task may be quite challenging. A large enterprise's ongoing transactions are complex and difficult to model. One alternative to constructing transaction-based models is to employ stochastic modeling techniques for forecasting. Many stochastic modeling approaches are based on time-series models. Autoregressive (AR), moving average (MA), and autoregressive moving average (ARMA) models inherently assume that the data is stationary (in the statistical sense of having a fixed average and standard deviation), which makes them unsuitable for many real world applications. The autoregressive integrated moving average (ARIMA) model weakens the requirement for stationarity, requiring only that the data have a stationary derivative (i.e., a differenced time series that can be integrated to recover the original time series). However, the ARIMA model (and its seasonal variant, SARIMA) has also proven unsatisfactory for many real world applications.

Real world data rarely follows any neat or closed-form stochastic models such as those given by the foregoing time-series models. Though a good correspondence can often be achieved with existing data that is used for training the model, the future predictions made by such models are inadequate for many applications, and degrade when model complexity is increased. An alternative approach to closed-form stochastic models would be desirable for forecasting in the business environment.

SUMMARY

Accordingly, there is disclosed herein systems and methods for profile-based forecasting with adaptive profile selection. Some method embodiments may comprise determining a reference set of profiles from a source set of profiles, and using the reference set of profiles to generate a forecast. The reference set determination comprises at least comparing a current, partial profile to each profile in the source set.

BRIEF DESCRIPTION OF THE DRAWINGS

For a detailed description of illustrative embodiments, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various invention embodiments. The disclosed embodiments should not be interpreted, or otherwise used, as limiting the scope of the disclosure or the claims. In addition, one skilled in the art will understand that the following description has broad application. The discussion of any embodiments is meant only to be illustrative of those embodiments, and is not intended to suggest that the scope of the disclosure or the claims is limited to those embodiments.

In the ensuing discussion, a forecasting method described in related patent application U.S. application Ser. No. 10/959,861, filed Oct. 6, 2004, entitled "Methods and Systems for Cumulative Attribute Forecasting Using a PDF of a Current-to-Future Value Ratio," is used to provide context for the adaptive selection methods disclosed herein. The adaptive selection methods are not limited to this forecasting method, but rather are applicable to any profile-based forecasting method. Examples of other suitable forecasting methods comprise those described in U.S. application Ser. No. 10/322,201, entitled "Method and System for Predicting Revenue Based on Historical Pattern Identification and Modeling," and U.S. application Ser. No. 10/355,353, entitled "Method and System for Constructing Prediction Interval Based on Historical Forecast Errors."

Figure 1:
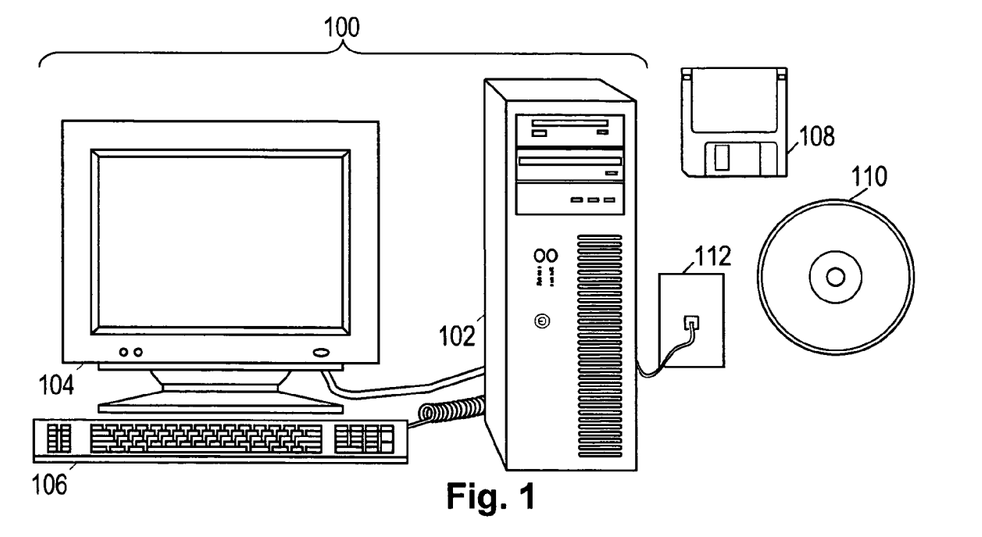
FIG. 1 is a diagram of an illustrative forecasting system with illustrative information carrier media in accordance with certain embodiments of the invention.

FIG. 1 shows an illustrative system 100 for providing accurate profile-based forecasts. System 100 is shown as a desktop computer 100, although any electronic device having some amount of computing power coupled to a user interface may be configured to carry out the methods disclosed herein. Among other things, servers, portable computers, personal digital assistants (PDAs) and graphing calculators may be configured to carry out the disclosed methods.

As shown, illustrative system 100 comprises a chassis 102, a display 104, and an input device 106. The chassis 102 comprises a processor, memory, and information storage devices. One or more of the information storage devices may store programs and data on removable storage media such as a floppy disk 108 or an optical disc 110. The chassis 102 may further comprise a network interface that allows the system 100 to receive information via a wired or wireless network, represented in FIG. 1 by a phone jack 112. The information storage media and information transport media (i.e., the networks) are collectively called "information carrier media."

The chassis 102 is coupled to the display 104 and the input device 106 to interact with a user. The display 104 and the input device 106 may together operate as a user interface. The display 104 is shown as a video monitor, but may take many alternative forms such as a printer, a speaker, or other means for communicating information to a user. The input device 106 is shown as a keyboard, but may similarly take many alternative forms such as a button, a mouse, a keypad, a dial, a motion sensor, a camera, a microphone or other means for receiving information from a user. Both the display 104 and the input device 106 may be integrated into the chassis 102.

Figure 2:
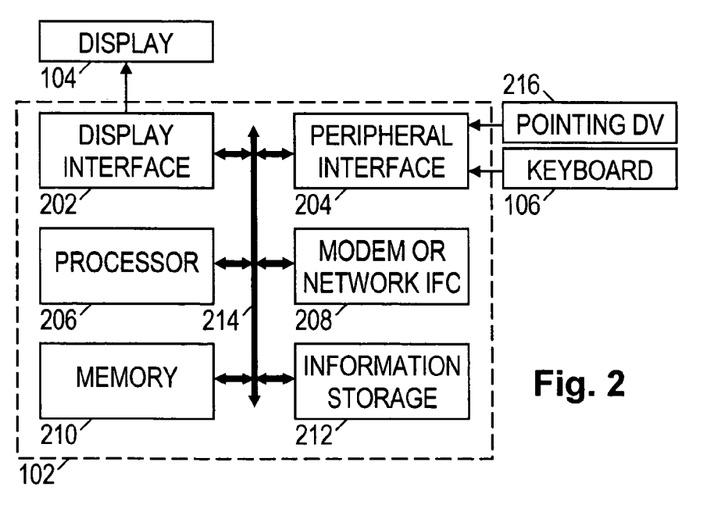
FIG. 2 is a block diagram of the illustrative forecasting system in accordance with certain embodiments of the invention.

FIG. 2 shows a simplified functional block diagram of system 100. The chassis 102 may comprise a display interface 202, a peripheral interface 204, a processor 206, a modem or other suitable network interface 208, a memory 210, an information storage device 212, and a bus 214. System 100 may be a bus-based computer, with the bus 214 interconnecting the other elements and carrying communications between them. The display interface 202 may take the form of a video card or other suitable display interface that accepts information from the bus 214 and transforms it into a form suitable for the display 104. Conversely, the peripheral interface 204 may accept signals from the keyboard 106 and other input devices such as a pointing device 216, and transform them into a form suitable for communication on the bus 214.

The processor 206 gathers information from other system elements, comprising input data from the peripheral interface 204, program instructions and other data from the memory 210, the information storage device 212, or from a remote location via the network interface 208. The processor 206 carries out the program instructions and processes the data accordingly. The program instructions may further configure the processor 206 to send data to other system elements, comprising information for the user which may be communicated via the display interface 202 and the display 104.

The network interface 208 enables the processor 206 to communicate with remote systems via a network. The memory 210 may serve as a low-latency temporary store of information for the processor 206, and the information storage device 212 may serve as a long term (but higher latency) store of information.

The processor 206, and hence the computer 100 as a whole, operates in accordance with one or more programs stored on the information storage device 212. The processor 206 may copy portions of the programs into the memory 210 for faster access, and may switch between programs or carry out additional programs in response to user actuation of the input device. The additional programs may be retrieved from information the storage device 212 or may be retrieved from remote locations via the network interface 208. One or more of these programs may configure system 100 to carry out at least one of the forecasting methods disclosed herein.

Figure 3:
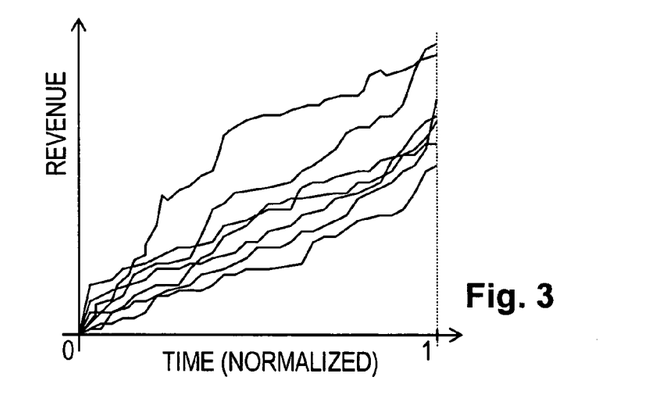
FIG. 3 shows illustrative graphs of cumulative revenue for multiple periods.

FIG. 3 is a graph showing revenue as a function of time for a number of past accounting periods. (The graphs are cumulative functions, but they are not necessarily strictly increasing functions since negative adjustments are possible.) Although revenue is shown, the methods disclosed herein may be applied to any business attribute profile, such as visits, transactions, sales, inventory, shipments, man-hours, costs, revenue, savings, liabilities, quantifiable risks, patents, licensees, customers, product demand, traffic patterns and network usage. The history of the attribute may be divided into time periods such as hours, days, weeks, months, quarters, years, or fiscal periods. The time periods may be fixed in length or they may vary from period to period. In the latter case, the time periods may be normalized before applying the disclosed methods. The choice of time periods may depend on the behavior being analyzed and the expected repetition patterns within such behaviors.

FIG. 3 shows that the profile varies from period to period, but there is some commonality to the patterns. The methods disclosed herein exploit this commonality in past periods to forecast future values in a current period. The forecasts are based on information from the current period and information from a dynamically adjusted subset of profiles from preceding periods.

Figure 4:
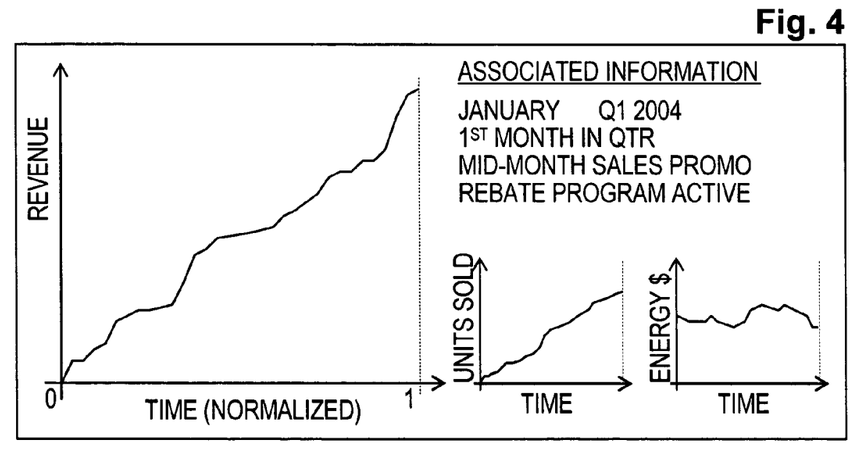
FIG. 4 shows an illustrative profile with associated information.

FIG. 4 shows illustrative information that may be associated with a profile, and in some embodiments, may be considered part of the profile. The profile comprises at least a past history of the business attribute that is sought to be forecast. Associated with the historical attribute pattern may be information regarding the timing of the pattern. Thus, the associated information may comprise the month, the season, the quarter, the year, the relative location of the month in the quarter (first, middle, last), and the existence of any promotional activities with the relative timing of those activities. The associated information may further comprise weather information and any other business attributes deemed relevant to forecast attribute. In FIG. 4, the profile is associated with historical information on number of products sold and historical energy costs.

Figure 5:
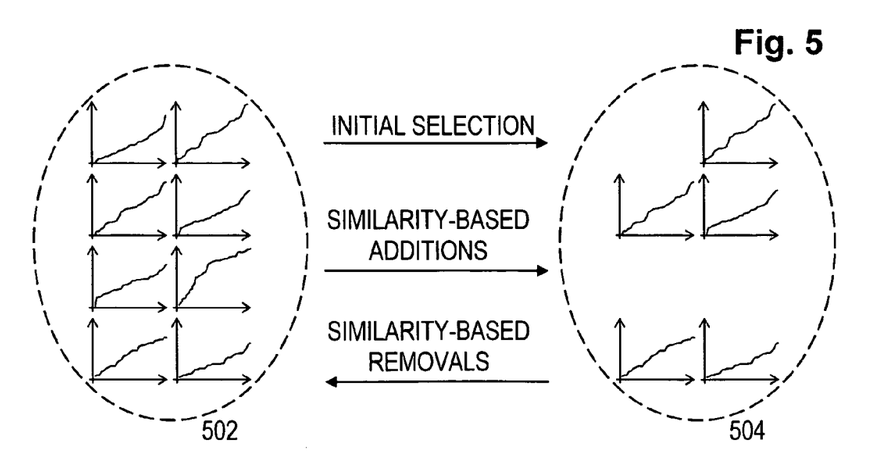
FIG. 5 shows an illustrative source profile set and an illustrative reference profile set.

FIG. 5 shows a source data set 502 and a reference data set 504. The reference data set 504 comprises profiles selected from the source data set 502. The contents of the reference data set 504 may be dynamically changed as new information becomes available.

In some embodiments, forecasting system 100 determines the reference set 504 in one of two modes, the mode being chosen based on the availability of information from a current period. If little or no information is available from the current period, the reference set 504 is determined based on initial selection rules. The initial selection rules employ the information associated with the various profiles in the source data set 502 to construct the reference set 504. Once sufficient information becomes available from the current period, forecasting system 100 determines the reference set 504 based on a similarity measurement between the profile so far and the corresponding portions of the profiles in the source data set 502. Those profiles most similar to the current profile are placed in the reference data set 504. The reference sets determined by these embodiments are deterministic, in that the contents of the reference sets do not depend on the contents of any previous reference set.

In other embodiments, forecasting system 100 determines the reference set iteratively. An initial reference set 504 is determined using initial selection rules. Thereafter, the reference set is systematically updated, so that sufficiently similar profiles are added to the reference set, and sufficiently dissimilar profiles are removed. As before, the forecasting system 100 performs the similarity measurement by comparing the available profile information for the current period to the corresponding portions of the profiles in the source data set 502.

In both cases, the initial selection rules are designed to select profiles from source data set 502 that will be relevant to the current period. For example, if the current period is the second fiscal quarter of 2004, the relevant profiles may be the second quarter of the five preceding fiscal years. If only two years of data are available, the reference set may comprise all preceding fiscal quarters. The initial selection rules (and the similarity-based selection rules as well) are designed to ensure that the reference set 504 will comprise a sufficient number of profiles for subsequent processing. To ensure more robustness for predictions and other model inferences, a minimum of three profiles may be required for subsequent processing, and some embodiments may require a larger minimum number of profiles in the reference set. However, some embodiments may require a minimum of as little as one profile. As an example, a profile for the same period in a previous year may be used for forecasting in the current period. Such measures may be necessary if historical data availability is an issue or significant changes have made older data less relevant.

In some embodiments, the initial selection rules may be event-based. For example, if the forecasting is being performed for week-long periods, the selection rules may choose previous week profiles based on the existence of federal holidays, sales promotions, and weather forecasts. Thus if the current period will have a federal holiday, a 24-hour sales promotion, and a sunny weather forecast, the selection rules may select profiles from previous periods having a federal holiday, a 24-hour sales promotion, and forecasts for sunny weather as members of the reference set 504. If the reference set 504 is large enough, then the selection rules could exclude profiles from previous periods not involving all three of the foregoing factors.

Once enough information is available from the current period to make a similarity determination meaningful, the contents of the reference set 504 are determined or adjusted using a similarity measurement. Some embodiments may require that a predetermined fraction of the current period have elapsed before a similarity determination can be made, e.g., 5%. Other embodiments may simply require that a predetermined number of data samples exist before a similarity determination can be made, e.g., five daily revenue reports.

Figure 6:
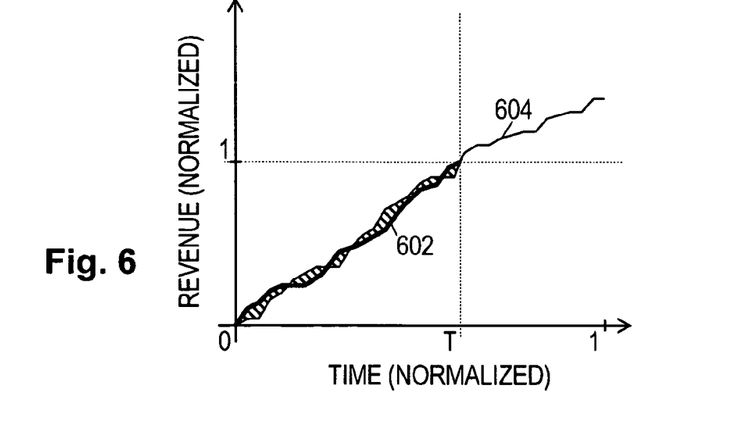
FIG. 6 shows an illustrative similarity measurement.

FIG. 6 shows an illustrative similarity measurement between a time series in a current period 602, and a time series from a previous period 604. If the length of the current and previous periods is different, the time scale may be normalized so that both periods have the same length. In some embodiments, the profile values themselves may be scaled so that the current value at time T is equal to the corresponding value in a previous period. A similarity measurement may be made using a distance calculation, which is represented by the shaded area in FIG. 6. The distance calculation may take the form of an integral or summation of the absolute value of the difference between the profiles, taken to some power. In equation form, the distance calculation may be expressed:

$$D_i = \left( \int_0^T |S(t) - S_i(t)|^p \, dt \right)^{\frac{1}{p}}, \tag{1}$$

where T is the current time, S(t) is the profile for the current period, $S_i(t)$ is the ith profile in the source data set 502, and p is a given integer greater than zero. Power p equals two for embodiments using a Euclidean distance measurement. A smaller distance indicates a greater similarity.

Once sufficient information from the current period is available, forecasting system 100 may periodically update or continuously update the reference set membership. (In this context, "continuously update" means that an update is performed each time the software is run.) As part of the update process, system 100 makes similarity calculations to compare the current period's profile to the corresponding portions of each profile in the source data set. In embodiments using the deterministic reference set embodiments, the similarity measurements may be sorted in order of decreasing similarity (increasing distance). A predetermined number of profiles from the beginning of the list may be comprised in the reference set by default. Thereafter, if any other profiles have a similarity (distance) greater than (less than) a predetermined threshold, these profiles are also included in the reference set.

In embodiments using the iterative reference set determination process, system 100 compares the similarity measurement for each profile not already in the reference set to a predetermined threshold. Those reference sets having a similarity greater than the predetermined threshold are added to the reference set 504. If the reference set 504 has more than a predetermined number of profiles, system 100 further compares the similarity measurements for the profiles already in the reference set to a second predetermined threshold. The second threshold may equal the first predetermined threshold, or may lower. Those profiles having a similarity measurement below the second predetermined threshold are removed from the reference set 504, so long as the number of profiles does not fall below a predetermined minimum.

Having determined a suitable reference set, system 100 uses the reference set to forecast a future value in the current period. An illustrative forecasting method is described in greater detail below. Before discussing the forecasting method further, however, a number of other similarity determination methods are discussed. Each of these methods may be used to replace the distance-measurement based similarity measurement described above.

One similarity measurement method is a composite-similarity measurement in which the distance measurement between profiles is augmented with other factors. These other factors may comprise distance measurements between other curves associated with the profiles. For example, FIG. 4 shows units sold and energy cost curves associated with the revenue profile. Distances can be calculated between curves associated with previous periods and corresponding curves associated with the current period. A weighted sum of these distance measurements can be used to obtain an overall similarity measurement.

Another similarity measurement method is a clustering procedure. The profile for the current period and each corresponding portion of the profiles in the source data set 502 can be represented by a multidimensional vector (each data sample is a vector component). A clustering algorithm is applied to the set of multi-dimensional vectors to automatically divide them into clusters. (In some embodiments, each of the vectors may be scaled to a predetermined energy before the clustering algorithm is applied.) The reference set 504 is then determined to be those profiles having vectors in the same cluster as the profile for the current period.

System 100 uses the profiles in the dynamically-adapted reference set 504 to generate a forecast. The following discussion describes one forecasting approach that has been found to benefit from a dynamically-adapted reference set, but other forecasting approaches may also be used.

Figure 7A:
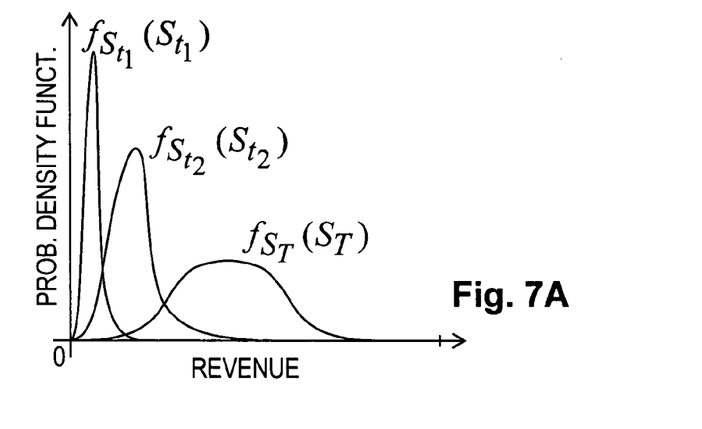
FIG. 7A shows illustrative graphs of unconditional probability density functions for revenue at different times in accordance with certain embodiments of the invention.

In the following discussion, let $S_t$ represent the cumulative attribute as a function of time t as the time ranges from t=0 to the end of the period t=T. The cumulative attribute $S_t$ is a stochastic variable having a probability density function $f_{S_t}(S_t)$ that varies as a function of time. Let $f_{S_T}(S_T)$ represent the probability density function for $S_T$, the value of the cumulative attribute at the end of the period. (It is this end-of-period value that we may wish to forecast.) FIG. 7A shows an illustrative evolution of the probability density function, giving curves at t=$t_1$, t=$t_2$, and t=T.

The probability density functions shown in FIG. 7A can be determined from the profiles in reference set 504, and a forecast for the end-of-period value can be made using $f_{S_T}(S_T)$. However, FIG. 3 suggests that a more accurate forecast may be possible if intermediate values are available and are taken into account. For example, if at the middle of the period, the current attribute value is near the high end of the range, then the end-of-period value is more likely to be near the high end of the range. Conversely, a low current attribute value makes a low end-of-period value more likely. Accordingly, the following discussion concerns a determination of the conditional probability density function $f(S_T|S_t)$, i.e., the probability distribution for the end-of-period attribute value $S_T$ when the current attribute value $S_t$ is known.

Bayes' formula for a conditional probability gives:

$$f(S_T|S_t) = \frac{f(S_t, S_T)}{f_{S_t}(S_t)}. \tag{2}$$

Unfortunately, the joint probability density function $f(S_t, S_T)$ is difficult to estimate with a limited amount of historical data. However, the joint probability density function can be expressed using Bayes' formula again:

$$f(S_T|S_t) = \frac{f(S_t|S_T)f_{S_T}(S_T)}{f_{S_t}(S_t)}. \tag{3}$$

Equation (3) raises another difficulty, namely, in determining the conditional probability density function on the right-hand side of the equation, the end-of-period value $S_T$ cannot be taken as known until the end of the period, at which point forecasting is unnecessary! Thus equation (3) needs to be revised to eliminate this source of circularity.

Figure 7B:
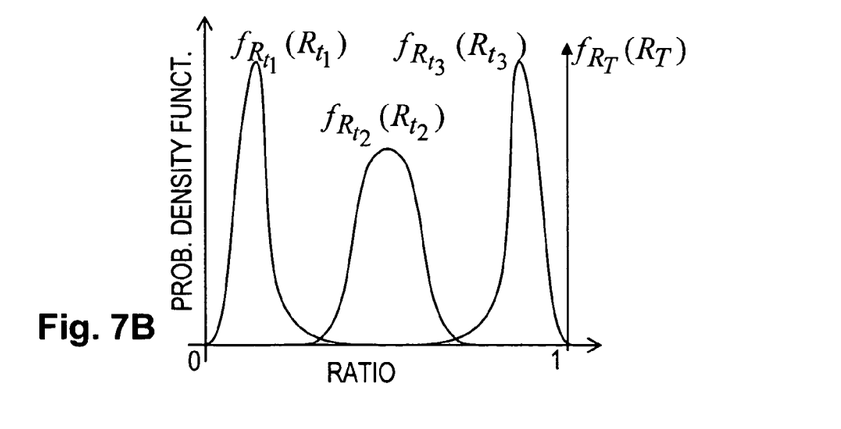
FIG. 7B shows illustrative graphs of unconditional probability density functions for ratios at different times in accordance with certain embodiments of the invention.

The present disclosure exploits a reformulation of the conditional probability density function $f(S_t|S_T)$ as follows:

$$f(S_t|S_T) = \frac{1}{S_T}f_{R_t}(R_t|S_T) = \frac{1}{S_T}f_{R_t}(S_t/S_T|S_T), \tag{4}$$

where the random variable has been scaled to obtain the ratio $R_t=S_t/S_T$. Advantageously, the probability distribution for the ratio $R_t$ (see examples shown in FIG. 7B) has been tested to be practically independent of the end-of-period value $S_t$ in the cumulative attributes considered by the authors. Thus it can be shown that $$f(S_T|S_t) = \frac{1}{S_T} \frac{f_{R_t}(S_t/S_T)f_{S_T}(S_T)}{f_{S_t}(S_t)}. \tag{5}$$

When forecasting, the current attribute value $S_t$ is fixed, so the denominator can be dropped in favor of a proportionality constant, giving:

$$f(S_T|S_t) \propto \frac{1}{S_T}f_{R_t}(S_t/S_T)f_{S_T}(S_T), \tag{6}$$

where ∝ represents proportionality. If needed, the proportionality constant can simply be determined by integration since the area under any probability density function is always equal to unity. Note that if the independence requirement between the ratio and the end-of-period value cannot be fully tested and satisfied, one can still use equation (6) for practical purposes, with the understanding that it is an approximation.

In any event, equation (6) provides a relationship that can be used for forecasting an end-of-period attribute value $S_T$ with knowledge of a current attribute value $S_t$, the unconditional probability density function for the ratio $R_t$, and the unconditional probability density function for the end-of-period attribute value $S_T$. Advantageously, these unconditional probability density functions can be divined with only a limited amount of historical information. In situations where historical information is extremely limited, of poor quality, or relevant only to a different situation, a person using this method may simply guess at the probability density functions, using experience and limited information as a guide. One approach to guessing may rely on assuming a Gaussian distribution and guessing at a suitable average and suitable standard deviation.

Figure 8:
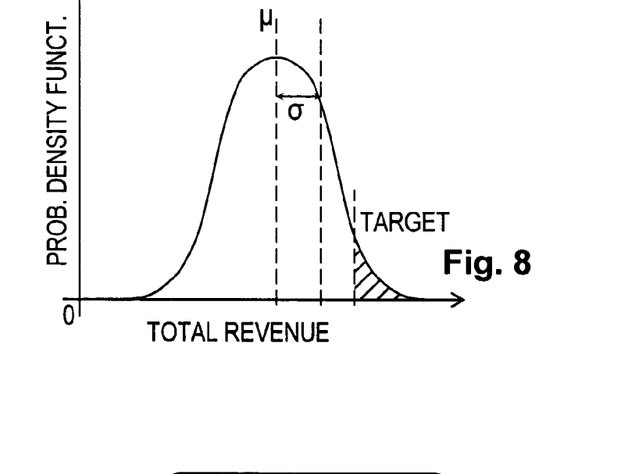
FIG. 8 is a graph of an illustrative conditional probability distribution function derived by certain embodiments of the invention.

In making a forecast, system 100 determines the unconditional probability density functions for intermediate and end-of-period cumulative attribute values, $f_{R_t}(R_t)$ and $f_{S_T}(S_T)$, respectively. System 100 identifies the current cumulative attribute value $S_t$ and its associated time t, and combines these to evaluate equation (6) for different potential values of $S_T$. This results in a curve such as that shown in FIG. 8. From this curve, system 100 can determine one or more values of interest. The curve's maximum occurs at the most likely end-of-period cumulative value. In a Gaussian curve, the maximum is at the mean p, as shown in FIG. 8. However, the curve is not necessarily Gaussian, and the most-likely value may be different than the mean. In a multi-mode distribution, there may be more than one local maximum (each local maximum is called a mode). Thus, values of interest to be determined by the computer may comprise the mean and the mode(s). Where a single-mode distribution is encountered, the values of interest may be the mean and the standard deviation σ. In some applications, the values of interest may define a range, e.g., a two-sided range around the most-likely value that contains 80% of the area under the curve. In other applications, the value of interest may be a probability of exceeding a target, as represented by the shaded area in FIG. 8. Each of these values of interest can be determined using numerical techniques.

The foregoing discussion is directed to forecasting values of interest relating to a cumulative attribute at the end of a period. However, the method can be readily modified to provide forecasting of any future value within the period. The derivation and mathematics proceed as before, with a simple substitution of $S_{t2}$ for $S_T$, where $t_2 \leq T$.

Figure 9:
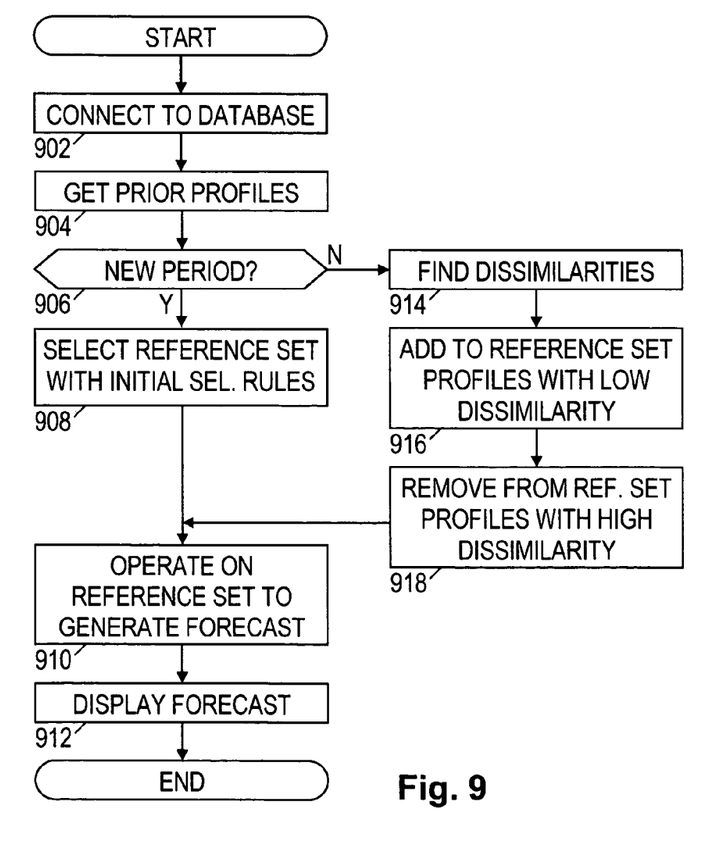
FIG. 9 is a flow diagram of an illustrative forecasting method in accordance with certain embodiments of the invention.

FIG. 9 shows a flow diagram for an illustrative computer-based implementation of a forecasting method using an adaptive reference set. Beginning with block 902, system 100 connects to a database having profile records for current and past periods. In block 904, the forecasting system gathers profiles and associated information for previous periods. In block 906, the system determines whether a new period has begun, i.e., whether there is insufficient information about the current period to perform similarity measurements. If so, system 908 determines the reference set of profiles by applying initial selection rules to the information associated with the profiles. In block 910, system 100 operates on the profiles in the reference set (and information from the current period) to generate a forecast, and in block 912, system 100 displays the forecast to a user. The forecast display may take the form of an image on a screen or on paper, sound communicated audibly to the user, and/or a tactile pattern made sensible to the user. The forecast may simply be a most-likely end-of-period value. The forecast may comprise a standard deviation, a range, or some indication of confidence in the forecast value. The forecast may be a likelihood of exceeding (or failing to reach) a target value. The forecast may be a graph of the conditional probability density function for the end-of-period value. The foregoing examples are illustrative and not limiting.

Returning to block 906, if system 100 determines that sufficient information is available from the current period to tailor the reference set, then in block 914 the system performs a distance (dissimilarity) calculation between the current profile and corresponding portions of each profile from a previous period. In block 916, system 100 adds to reference set 504 any profiles having a small distance that are not already in the reference set. In block 918, system 100 removes from reference set 504 any profiles having a large distance measurement. (This removal may be subject to a requirement that reference set 504 comprise at least some minimum number of profiles.) The determination of "small" and "large" distances may be made by comparing the distance measurements to respective predetermined thresholds. In one embodiment, the threshold for a small distance threshold is a Euclidean distance measurement of less than 20% of the current profile's energy, and a large distance threshold is a Euclidean distance measurement of more than 30% of the current profile's energy. From block 918, control moves to block 910, described previously.

Note that blocks 906 and 914-918 may be considered optional, and may be omitted from some embodiments. Omitting these blocks allows the initial selection rules to determine the content of the reference set 504, and causes the reference set to remain static for the current period.

From the description provided herein, those skilled in the art are readily able to combine software created as described with appropriate general purpose or special purpose computer hardware to create a computer system and/or computer subcomponents embodying the invention, and to create a computer system and/or computer subcomponents for carrying out the method of the invention.

The foregoing description of illustrative embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method comprising:
   (a) determining, by a processor, whether there is sufficient information that has been acquired so far about a current time period to perform similarity measurements;
   (b) in response to determining that there is not sufficient information that has been acquired so far about the current time period to perform similarity measurements, operating in a first mode in which the processor selects a reference set of profiles from a source set of profiles, using a plurality of initial selection rules;
   (c) in response to determining that there is sufficient information that has been acquired so far about the current time period to perform similarity measurements, operating in a second mode in which the processor selects the reference set of profiles by, for each previous profile of one or more previous profiles indicative of prior time periods,
      obtaining a similarity measurement through the comparison, by the processor, a current partial profile indicative of the information acquired so far about the current time period to the previous profile;
      where the similarity measurement denotes low dissimilarity between the current partial profile and the previous profile, adding, by the processor, the previous profile to the reference set of profiles;
      where the similarity measurement denotes high dissimilarity between the current partial profile and the previous profile, removing, by the processor, the previous profile to the reference set of profiles if present; and,
   (d) thereafter, using, by the processor, the reference set of profiles and the current partial profile to generate a forecast,
   repeating (a), (b), and (c) one or more times before performing (d), such that the first mode is initially used to select the reference set of profiles until sufficient information has been acquired about the current period to perform similarity measurements, and such that the second mode is thereafter used to refine the reference set of profiles after sufficient information has been acquired about the current period to perform similarity measurements; and
   wherein the first mode is used to select the reference set of profiles in a rule-based manner where insufficient information has been acquired so far about the current time period to perform similarity measurements, and the second mode is used to select the reference set of profiles in a similarity measurement-based manner where sufficient information has been acquired so far about the current time period to perform similarity measurements.

2. The method of claim 1, and wherein each profile comprises:
   a past history of a selected attribute that is to be forecast in the future;
   a pattern of the selected attribute over time;

identification of other attributes relevant to forecasting the selected attribute; and, identification of other, non-attribute information relevant to forecasting the selected attribute.

3. The method of claim 1, wherein the initial selection rules are event-based, in that the initial selection rules govern selection of the reference set of profiles from the source set of profiles based on one or more events that are to occur within the current time period.

4. The method of claim 3, wherein the events are selected from: holidays within the current time period; sales promotions within the current time period; and, weather information for the current time period.

5. The method of claim 1, wherein the similarity measurement is $$D_i = \left( \int_0^T |S(t) - S_i(t)|^p \, dt \right)^{\frac{1}{p}},$$

where $D_i$ is a difference in distance between the current partial profile and the previous profile, T is a current time, S(t) is the current partial profile, $S_i(t)$ is the previous profile, and p is a constant.

6. The method of claim 5, wherein p equals 2 so that the similarity measurement is a Euclidean distance measurement.

7. A computer comprising:
a display;
a processor coupled to the display; and,
a memory couple do the processor,
wherein the memory stores software that upon being executed by the processor generates a forecast using a reference set of profiles and a current partial profile,
wherein the reference set of profiles is generated in accordance with one or more of a first mode and a second mode based on whether there is sufficient information that has been acquired so far about a current time period,
wherein in the first mode, the reference set of profiles are selected from a source set of profiles using a plurality of initial selection rules,
wherein in the second mode, the reference set of profiles are selected by, for each previous profile of one or more previous profiles indicative of prior time periods,
obtaining a similarity measurement through the comparison of a current partial profile indicative of the information acquired so far about the current time period to the previous profile;
where the similarity measurement denotes low dissimilarity between the current partial profile and the previous profile, adding the previous profile to the reference set of profiles;
where the similarity measurement denotes high dissimilarity between the current partial profile and the previous profile, removing the previous profile to the reference set of profiles if present,
and repeating the above steps one or more times, such that the first mode is initially used to select the reference set of profiles until sufficient information has been acquired about the current period to perform similarity measurements, and the second mode is thereafter used to refine the reference set of profiles after sufficient information has been acquired about the current period to perform similarity measurements,
wherein the first mode is used to select the reference set of profiles in a rule-based manner where insufficient information has been acquired so far about the current time period to perform similarity measurements, and the second mode is used to select the reference set of profiles in a similarity measurement-based manner where sufficient information has been acquired so far about the current time period to perform similarity measurements.

8. The computer of claim 7, and wherein each profile comprises:
a past history of a selected attribute that is to be forecast in the future;
a pattern of the selected attribute over time;
identification of other attributes relevant to forecasting the selected attribute; and,
identification of other, non-attribute information relevant to forecasting the selected attribute.

9. The computer of claim 7, wherein the initial selection rules are event-based, in that the initial selection rules govern selection of the reference set of profiles from the source set of profiles based on one or more events that are to occur within the current time period.

10. The computer of claim 9, wherein the events are selected from: holidays within the current time period; sales promotions within the current time period; and, weather information for the current time period.

11. The computer of claim 7, wherein the similarity measurement is $$D_i = \left( \int_0^T |S(t) - S_i(t)|^p \, dt \right)^{\frac{1}{p}},$$

where $D_i$ is a difference in distance between the current partial profile and the previous profile, T is a current time, S(t) is the current partial profile, $S_i(t)$ is the previous profile, and p is a constant.

12. The computer of claim 11, wherein p equals 2 so that the similarity measurement is a Euclidean distance measurement.

13. A computer-readable medium storing software that is executable by a processor to:
determine whether there is sufficient information that has been acquired so far about a current time period to perform similarity measurements;
in response to determining that there is not sufficient information that has been acquired so far about the current time period to perform similarity measurements,
operate in a first mode in which a reference set of profiles is selected from a source set of profiles, using a plurality of initial selection rules;
in response to determining that there is sufficient information that has been acquired so far about the current time period to perform similarity measurements,
operate in a second mode in which the reference set of profiles is selected by, for each previous profile of one or more previous profiles indicative of prior time periods,
obtaining a similarity measurement by comparing a current partial profile indicative of the information acquired so far about the current time period to the previous profile;
where the similarity measurement denotes low dissimilarity between the current partial profile and the previous profile, adding the previous profile to the reference set of profiles;
where the similarity measurement denotes high dissimilarity between the current partial profile and the previous profile, removing the previous profile to the reference set of profiles if present; and, (d) thereafter, use the reference set of profiles and the current partial profile to generate a forecast, repeating (a), (b), and (c) one or more times before performing (d), such that the first mode is initially used to select the reference set of profiles until sufficient information has been acquired about the current period to perform similarity measurements, and wherein the second mode is thereafter used to refine the reference set of profiles after sufficient information has been acquired about the current period to perform similarity measurements, and wherein the first mode is used to select the reference set of profiles in a rule-based manner where insufficient information has been acquired so far about the current time period to perform similarity measurements, and the second mode is used to select the reference set of profiles in a similarity measurement-based manner where sufficient information has been acquired so far about the current time period to perform similarity measurements.

14. The medium of claim 13, and wherein each profile comprises:

a past history of a selected attribute that is to be forecast in the future;

a pattern of the selected attribute over time;

identification of other attributes relevant to forecasting the selected attribute; and, identification of other, non-attribute information relevant to forecasting the selected attribute.

15. The method of claim 13, wherein the initial selection rules are event-based, in that the initial selection rules govern selection of the reference set of profiles from the source set of profiles based on one or more events that are to occur within the current time period.

16. The method of claim 15, wherein the events are selected from: holidays within the current time period; sales promotions within the current time period; and, weather information for the current time period.

17. The method of claim 13, wherein the similarity measurement is $$D_i = \left( \int_0^T |S(t) - S_i(t)|^p \, dt \right)^{\frac{1}{p}},$$

where $D_i$ is a difference in distance between the current partial profile and the previous profile, T is a current time, S(t) is the current partial profile, $S_i(t)$ is the previous profile, and p is a constant.

18. The method of claim 17, wherein p equals 2 so that the similarity measurement is a Euclidean distance measurement.

* * * * *

UNITED STATES PATENT AND TRADEMARK OFFICE
CERTIFICATE OF CORRECTION

PATENT NO. : 7,664,671 B2
APPLICATION NO. : 11/001455
DATED : February 16, 2010
INVENTOR(S) : Jerry Z. Shan It is certified that error appears in the above-identified patent and that said Letters Patent is hereby corrected as shown below:

In column 11, line 32, in Claim 7, delete "couple do" and insert -- coupled to --, therefor.

Signed and Sealed this

Eighth Day of June, 2010

David J. Kappos
*Director of the United States Patent and Trademark Office*